US011429792B2

(12) United States Patent
Huang et al.

(10) Patent No.: US 11,429,792 B2
(45) Date of Patent: Aug. 30, 2022

(54) CREATING AND INTERACTING WITH DATA RECORDS HAVING SEMANTIC VECTORS AND NATURAL LANGUAGE EXPRESSIONS PRODUCED BY A MACHINE-TRAINED MODEL

(71) Applicant: Microsoft Technology Licensing, LLC, Redmond, WA (US)

(72) Inventors: Li Huang, Sammamish, WA (US); Congyong Su, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 16/869,336

(22) Filed: May 7, 2020

(65) Prior Publication Data
US 2021/0350082 A1    Nov. 11, 2021

(51) Int. Cl.
*G06F 17/27* (2006.01)
*G06F 40/30* (2020.01)
*G06N 20/00* (2019.01)
*G06F 16/25* (2019.01)
*G06N 5/04* (2006.01)

(52) U.S. Cl.
CPC ............ *G06F 40/30* (2020.01); *G06F 16/258* (2019.01); *G06N 5/04* (2013.01); *G06N 20/00* (2019.01)

(58) Field of Classification Search
CPC ...... G06F 16/258; G06F 40/30; G06F 16/901; G06N 20/00; G06N 5/04; G10L 15/16
USPC ............................................................ 704/9
See application file for complete search history.

(56) References Cited

U.S. PATENT DOCUMENTS

2015/0293976 A1   10/2015  Guo et al.
2020/0395008 A1*  12/2020  Cohen ..................... G10L 15/16

FOREIGN PATENT DOCUMENTS

WO    2017074823 A1    5/2017

OTHER PUBLICATIONS

Li, et al., "Approximate Nearest Neighbor Search on High Dimension Data—Experiments, Analyses, and Improvement," arXiv:1610.02455v1 [CS.DB], Oct. 8, 2016, 26 pages.
Vaswani, et al., "Attention Is All You Need," arXiv:1706.03762v5 [cs.CL], Dec. 6, 2017, 15 pages.
(Continued)

*Primary Examiner* — Md S Elahee

(57) ABSTRACT

A computer-implemented technique uses a machine-trained model to convert input information provided by a user into a natural language expression and a semantic vector. The semantic vector provides a distributed representation of the natural language expression. The technique then uses the generated semantic vector to find a target data record having a target semantic vector that is within a prescribed distance to the generated semantic vector. The technique then outputs at least a target natural language expression that is associated with the target data record. The target data record is produced in an offline process that converts one or more attribute values in an existing structured data record into the target semantic vector and the target natural language expression. Also described herein is a technique for training the machine-trained model and for updating existing collections of data records using the machine-trained model.

19 Claims, 10 Drawing Sheets

(56) References Cited

OTHER PUBLICATIONS

Leidner, et al., "Making Structured Data Searchable via Natural Language Generation," in FQAS 2013: Proceedings of the 10th International Conference on Flexible Query Answering Systems, LNAI 8132, Springer-Verlag, Berlin, Heidelberg, Larsen, et al. (Eds.), Sep. 2013, pp. 495-506.
PCT Search and Written Opinion for International Application No. PCT/US2021/028043, dated Aug. 24, 2021, 14 pages.

* cited by examiner

OVERVIEW OF OPERATION OF THE TRAINING-STAGE ENVIRONMENT 1002

PRODUCE A PLURALITY OF TRAINING EXAMPLES, EACH TRAINING EXAMPLE INCLUDING A PAIR HAVING A FIRST MEMBER AND A SECOND MEMBER, THE FIRST MEMBER DESCRIBING ATTRIBUTE VALUES REGARDING A PARTICULAR TOPIC, AND THE SECOND MEMBER IDENTIFYING A LINGUISTIC EXPRESSION THAT RELATES TO THE ATTRIBUTE VALUES.
1004

TRAIN A MACHINE-TRAINED MODEL BASED ON THE TRAINING EXAMPLES, THE MACHINE TRAINED MODEL BEING CONFIGURED TO CONVERT INPUT INFORMATION INTO A NATURAL LANGUAGE EXPRESSION BY MODIFYING THE INPUT INFORMATION IN A PLURALITY OF STAGES, EACH STAGE OPERATING ON A SET OF INPUT TOKENS PROVIDED BY A PRECEDING STAGE, THE STAGES INCLUDING AT LEAST ONE CELL-ADDING STAGE AND AT LEAST ONE PREDICTION STAGE.
1006

FIG. 10

CREATING AND INTERACTING WITH DATA RECORDS HAVING SEMANTIC VECTORS AND NATURAL LANGUAGE EXPRESSIONS PRODUCED BY A MACHINE-TRAINED MODEL

BACKGROUND

A typical search engine operates by receiving a search query submitted by a user that includes one or more keywords, interpreting the search query using an engine-specific algorithm to provide an engine-specific interpretation, and then using the engine-specific interpretation to locate an appropriate data record in an index. This approach is problematic because the user may have difficulties expressing his or her search intent in a format expected by a particular search engine. Even if the user does enter a descriptive search query, the search engine may process it in such a manner to dilute its expressiveness. The above-summarized approach is also not readily scalable. This is because different search engines typically use different algorithms to process queries, making the index generated by one search engine generally incompatible with the index maintained by another search engine. This further prevents the user from performing a search across databases maintained by different providers. Finally, the above-summarized approach may not provide a convenient mechanism for adding and removing data records from a data store.

SUMMARY

A computer-implemented technique is described herein that uses a machine-trained model to convert input information provided by a user into a natural language expression and a semantic vector. The generated semantic vector provides a distributed representation of the natural language expression. The technique then finds a target data record having a target semantic vector that is closest to the generated semantic vector in a semantic vector space. The technique then outputs at least a target natural language expression that is associated with the target data record. The target data record is produced in an offline process that converts one or more attribute values in an existing structured data record into the target semantic vector and the target natural language expression.

According to one illustrative aspect, the machine-trained model operates by processing linguistic tokens in a plurality of stages. The stages include at least one cell-adding stage and at least one prediction stage. Each cell-adding stage involves adding at least one placeholder cell to a set of input tokens provided by a stage that precedes the cell-adding stage. Each prediction stage involves determining whether there is a viable linguistic token to replace each placeholder cell provided by a cell-adding stage that precedes the prediction stage.

According to another aspect, a technique is described herein for transforming structured data records into the type of data records summarized above, in which each data record is tagged with a semantic vector and a natural language expression.

According to another aspect, a technique is described herein for training the type of machine-trained model summarized above.

The technique has the advantage of allowing a user to more easily enter input information that expresses his or her intent. The technique also converts the user's input information into a form that more faithfully represents and preserves that intent. The technique also provides a way of harmonizing the data records maintained by plural providers. The technique also provides a way of conveniently adding and removing data records from a data store.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows a process that summaries a manner in which a training system (of FIG. 1) trains the machine-trained model of FIG. 3.

Figure 1:
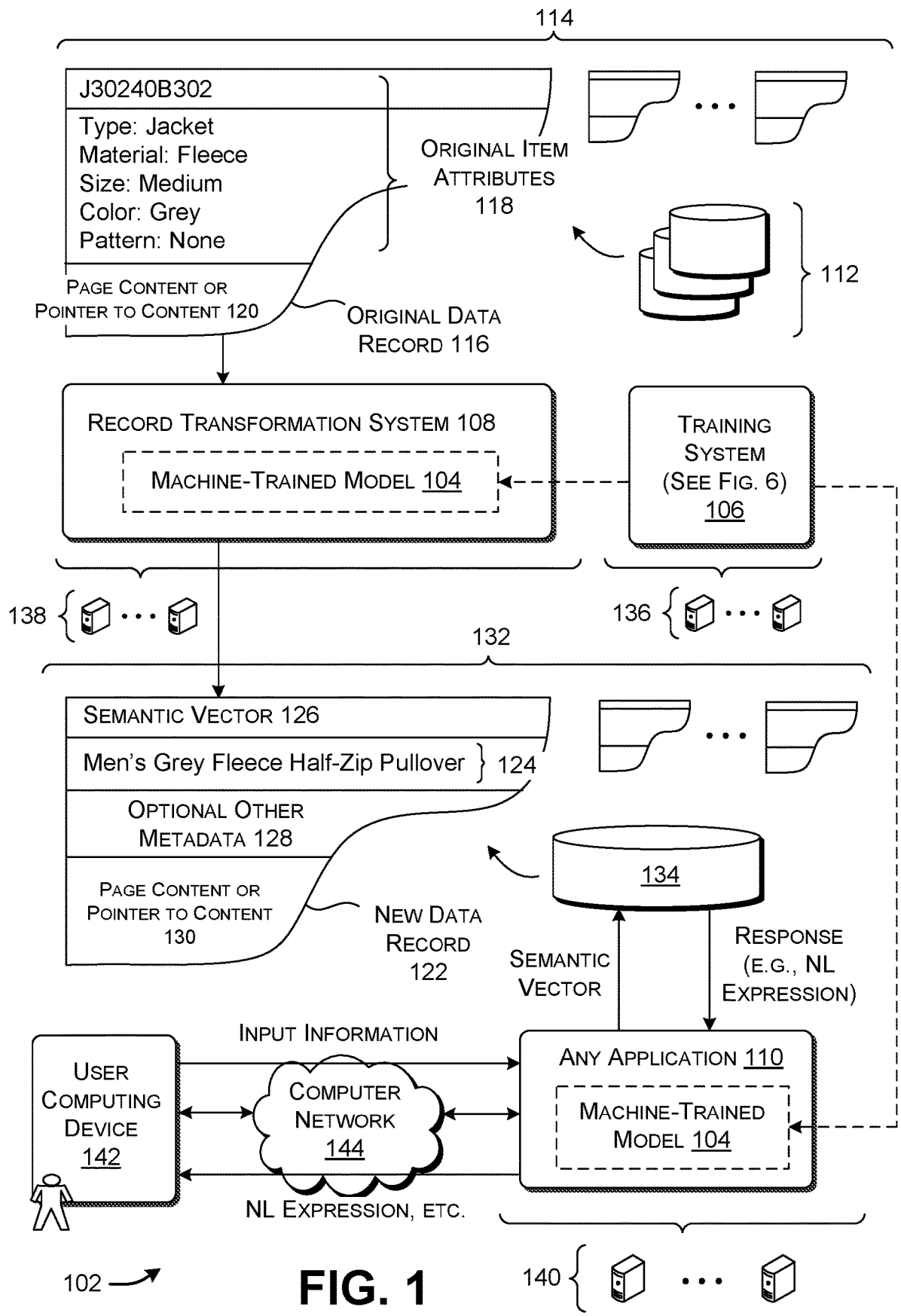
FIG. 1 shows an overview of a computing environment for training and using a machine-trained model. The machine-trained model transforms input information into a semantic vector and a natural language expression.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented environment for creating and then interacting with a set of data records, in which each data record includes a semantic vector and a natural language (NL) expression produced by a machine-trained model. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," "module," "logic," "system," "model," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be considered respective logic components and can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Environment

FIG. 1 shows an overview of a computing environment 102 for training and using a machine-trained model 104. The machine-trained model 104 transforms input information into a semantic vector and a natural language (NL) expression. As used herein, the term "machine-trained model" encompasses logic, as governed by machine-trained parameter values, for transforming input information into output information. That is, the term "machine-trained model" describes a component implemented by hardware logic circuitry for performing a particular transformation function, as informed by a set of parameter values.

The computing environment 102 of FIG. 1 includes a training-stage environment, a record transformation environment, and an inference-stage environment. The training-stage environment uses a training system 106 to generate the machine-trained model 104. The record transformation environment uses a record transformation system 108 for converting existing data records into new data records using the machine-trained model 104. And the inference-stage environment uses any application 110 (such as a search engine application) to provide some service to an end user using the machine-trained model 104.

Starting with the training-stage environment, the training system 106 first uses an example-mining system (not shown in FIG. 1) to mine a set of training examples from one or more sources of linguistic information. It then uses a model-generating system (not shown in FIG. 1) to produce the machine-trained model 104 based on the training examples. This process will be described below in greater detail with reference to FIGS. 6 and 7. By way of introduction, the example-mining system can submit a query to find a digital page that describes a product that matches a set of attribute values. The example-mining system can then extract at least one NL expression from the identified digital page that satisfies an extraction test (described below). The pairing of the attribute values and the extracted NL expression constitutes one positive training example. The model-generating system iteratively operates on these training examples to produce the machine-trained model 104, e.g., by increasing those instances in which the machine-trained model 104 correctly maps input information into appropriate NL expressions and decreasing those instances in which the machine-trained model 104 maps input information into incorrect or non-ideal NL expressions.

The record transformation system 108 can operate on one or more sets of structured data records provided in one or more respective existing data stores 112. Each set of data records may describe a set of products offered by a particular entity via an online service. For example, one set of data records may describe a catalog of apparel offered by a particular merchant of apparel. Each data record is characterized as "structured" because it uses a predetermined entity-specific format to describe different features of an item.

FIG. 1 shows one set of original data records 114, including a representative data record 116. The data record 116 includes a set of attribute values 118 for describing a particular jacket. For instance, the attribute values 118 can describe the type of jacket, the material that the jacket is made from, the size of the jacket, the color of the jacket, and so on. The data record 116 can also include a field 120 that provides content associated with a particular web page associated with the jacket. Alternatively, the field 120 may include a pointer to the web page. The organization and type of information contained in this data record 116 is set forth here merely in the spirit of illustration, not limitation; other sets of data records can adopt other formats for describing products, or, more generally, items.

The record transformation system 108 produces a new data record 122 by transforming at least some of the information presented in the original data record 116. For instance, the record transformation system 108 can map at least the attribute values 118 in the original data record 116 into an NL expression 124 and a semantic vector 126. The NL expression 124 corresponds to a phrase or sentence that describes the product under consideration, here a particular jacket. Informally, the NL expression 124 may correspond to the manner in which a human user would choose to refer to the item to another human user. Here, the NL expression 124 includes the phrase "Men's grey fleece half-zip pullover." Note that the machine-trained model 104 optionally duplicates one or more attribute values 118 in the NL expression 124, such as "fleece" and "grey." Further note that the machine-trained model 104 may add words to the NL expression 124 that do not appear in the original attribute values 118, such as "half-zip" and "pullover." The machine-trained model 104 adds these words based on its knowledge, gained through training, that other training examples use these words to describe jackets that are characterized by the specified attribute values 118.

The semantic vector 126 is a k dimensional vector that provides a distributed representation of the NL expression 124, where k is an environment-specific parameter. A distributed representation means that the semantic vector 126 represents the meaning of the NL expression 124 by specifying information that is distributed across its various dimensions in a factorized manner. This is contrasted with a one-hot representation that assigns a separate dimension of a sparse vector to each possible NL expression.

The machine-trained model 104 is also trained to produce semantic vectors such that the distance between any two vectors in semantic space is related to the similarity between the two expressions that they represent. As such, for instance, the machine-trained model 104 would produce a vector for the word "cougar" that is closer in vector space to a vector for the name "mountain lion" compared to a vector for the word "rabbit."

The updated or new data record 122 can optionally include other fields. For instance, the new data record 122 can include other metadata 128 that describes the product. For instance, the other metadata 128 can describe a store at which the jacket can be found. In addition, or alternatively, the metadata 128 can duplicate any of the original attribute values 118. Another optional field 130 includes the content associated with a web page that describes the jacket or a pointer to that web page. Again, the organization and type of information contained in this data record 122 is set forth here merely in the spirit of illustration, not limitation; other sets of data records can adopt other formats for describing products, so long as they at least include an NL expression and semantic vector.

Altogether, the record transformation system 108 can produce a complete set of data records 132 and can store this set of data records 132 in a data store 134. In some cases, the record transformation system 108 can produce a master set of data records that combine original data records 114 from multiple original sets of data records, potentially maintained by plural entities. This master data store 134 can replace the existing data stores 112. Alternatively, the master data store 134 can supplement the existing data stores 112. For instance, the master data store 134 can provide data records that include links to appropriate original data records 114 in the original data stores 112. Alternatively, or in addition, the original data records 114 can include links to appropriate new data records in the data store 134. Alternatively, or in addition, the record transformation system 108 can store the NL expressions and semantic vectors as new fields in the original data records 114, in which case the data store 134 can be considered as a transformed or updated version of the original data stores 112. Still other storage strategies can be used.

The record transformation system 108 can also iteratively perform the above processing for any new data record added to the data store 134, e.g., corresponding to a new product that is added to a provider's catalogue. The record transformation system 108 can produce a new record without changing any existing data records in the data store 134, without changing any algorithms used to generate the data records, and without requiring retraining of the machine-trained model 104. That is, the record transformation system 108 continues to use the existing machine-trained model 104 to produce a new data record that includes a semantic vector and an NL expression. Likewise, the record transformation system 108 can remove any data records from the data store 134 without affecting any other existing records in the data store, without changing any algorithms used to generate the data records, and without requiring retraining of the machine-trained model 104.

In the inference stage, the application 110 can use the data records in the data store 134 to provide any service to end users. In one case, the application 110 performs a search function. The search function involves receiving input information from a user that includes one or more words. The application 110 uses the machine-trained model 104 to map the input information into an NL expression and a semantic vector, which can be referred to as a query semantic vector. It can use the query semantic vector to find a target data record in the data store 134 that has the nearest semantic vector in vector space. The application 110 can use any distance metric to make this determination, such as cosine similarity, Manhattan distance, etc. The application 110 can further using any search algorithm to find the closest vector, such as approximate nearest neighbor (ANN). Background information on the general topic of ANN can be found, for instance, in Li, et al., "Approximate Nearest Neighbor Search on High Dimension Data—Experiments, Analyses, and Improvement," arXiv:1610.02455v1 [cs.DB], Oct. 8, 2016, 26 pages. The application 110 can then provide any information regarding a matching data record to the user. In one implementation, the application 110 can provide the NL expression associated with the matching data record. The application 110 can also provide a link that enables the user to access a page or other information associated with the matching data record.

In another implementation, the application 110 uses the machine-trained model 104 to implement a question-and-answer (Q&A) service. Here, the application 110 receives a question from the user, maps the question to a question semantic vector, and finds a target data record in the data store 134 having the closest semantic vector to the question semantic vector in semantic space. The matching target data record corresponds to an appropriate answer to the user's question.

In another implementation, the application 110 uses the machine-trained model 104 to implement a chatbot interface that allows a user to perform any task, such as scheduling a meeting, making a reservation, etc. Here, the application 110 receives an utterance from the user, maps the utterance to an utterance semantic vector, and finds a target data record in the data store 134 having the closest semantic vector to the utterance semantic vector in semantic space. The matching target record corresponds to an appropriate response to the user's utterance. For instance, the response may be designed to solicit additional information from the user, or advance the user to a next phase of a multi-part task. These kinds of applications are mentioned in the spirit of illustration, not limitation; other implementations can apply the machine-trained model 104 to yet other applications.

One or more servers 136 can implement the training system 106. One or more servers 138 can implement the record transformation system 108. One or more servers 140 can implement any application 110. Alternatively, or in addition, any aspect of these systems can be implemented in local fashion by a local computing device of any type.

A user may interact with the application 110 using a user computing device 142 via a computer network 144. For instance, the user may interact with the application 110 using a browser application (not shown) provided by the user computing device 142. The user computing device 142 can correspond to any of a personal desktop computing device, a laptop computing device, a game console, a set-top box, any type of handheld computing device (e.g., a smartphone, a tablet-type computing device, etc.), a wearable computing device, an Internet-of-Things (IoT) device, a mixed-reality device, and so on, or any combination thereof. The computer network 144 may correspond to a local area network, a wide area network (e.g., the Internet), one or more point-to-point links, and so on, or any combination thereof.

Figure 2:
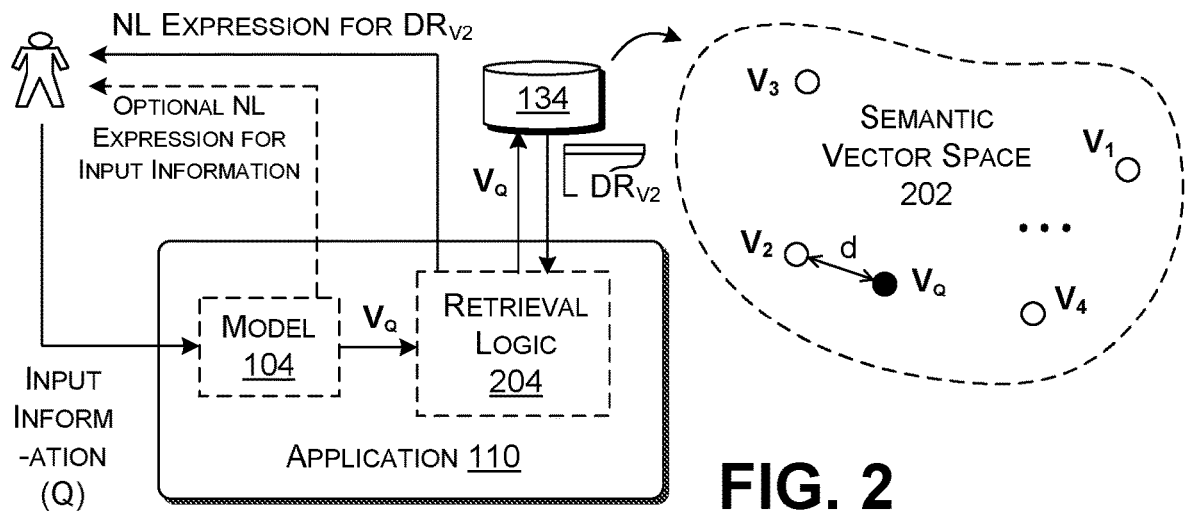
FIG. 2 illustrates an operation of an application that uses the machine-trained model produced by the computing environment of FIG. 1.

FIG. 2 illustrates the operation of the application 110 with respect to a vector space 202. Assume here that a user enters input information (Q) which may include one or more words. The application 110 uses the machine-trained model 104 to map the input information into a query semantic vector $V_Q$. The application 110 then uses retrieval logic 204 to search the data store 134 to find the semantic vector that is closest to vector $V_Q$ in semantic space. Here, assume that the retrieval logic 204 determines that vector $V_2$ is closest to the vector $V_Q$ in semantic space 202. Assume that the data store 134 provides a target data record $DR_{V2}$ that is associated with the vector $V_2$, meaning that $DR_{V2}$ includes $V_2$ as one of its data record values. The application 110 outputs information that it pulls from a target data record $DR_{V2}$. For example, the application 110 can output an NL expression provided by this data record $DR_{V2}$.

In addition to retrieving information regarding the matching target data record $DR_{v2}$, the machine-trained model 104 directly converts the input information Q into an NL expression. The application 110 can also optionally provide this NL expression to the user. For example, the application 110 can display this NL expression to the user in response to the user typing the input information. This feedback helps the user determine whether the application 110 is correctly interpreting his or her input information. For instance, assume that the input information includes the phrase "Purchase red fleece pullover warm." The application 110 can use the machine-trained model 104 to convert this input information into the expression "Red fleece pullover with removable liner," and then provide a message to the user that reads, "I think you are asking for a red fleece pullover with removable liner. Is this correct? If not, please add a few more descriptive words." This optional feedback also provides an opportunity for the user to revise his or her input information, so to more effectively convey his or her search intent.

Figure 3:
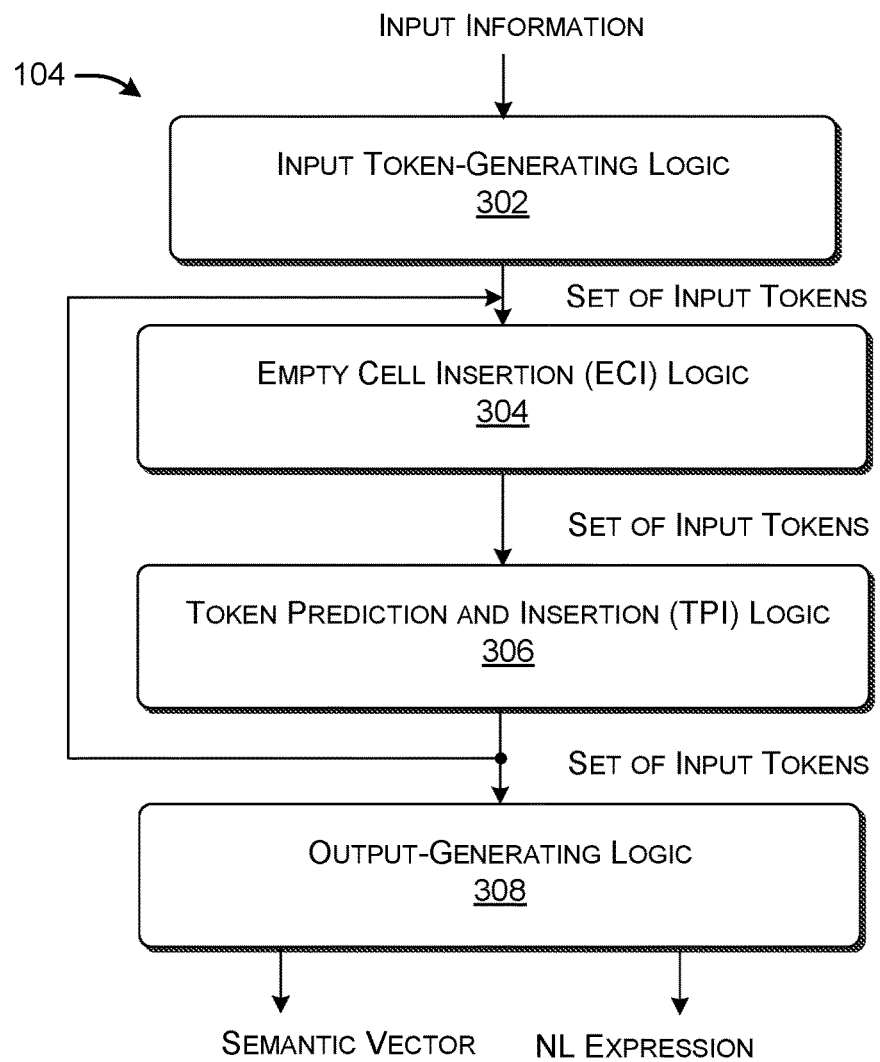
FIG. 3 shows one implementation of a machine-trained model produced using the computing environment of FIG. 1.

FIG. 3 shows one implementation of a machine-trained model 104 produced using the computing environment 102 of FIG. 1. The machined-trained model 104 includes a set of logic modules that perform different respective functions. As will be described, the machine-trained model 104 invokes at least some of the logic modules in an iterative loop.

An input token-generating logic 302 receives input information. In the context of inference-stage processing, the input token-generating logic 302 receives a query or question from a user that includes one or more words. More specifically, in one context, the user may input one or more keywords that describe a product of interest. In another context, the user may provide a short phrase or sentence that describes the product of interest. In some cases, the phrase provides a relatively complete and clear description of the product. In other cases, the phrase may provide a description that is ambiguous or otherwise deficient in one or more regards. In the context of the operation of the record transformation system 108, the input token-generating logic 302 receives input information in the form of a set of attribute values in an existing structured data record.

The input token-generating logic 302 can then convert the input information into a set of input tokens expressed as a set of input vectors. The tokens can be expressed on any level of granularity. For instance, the input token-generating logic 302 can assign a unique token to each word of the input information, or each n-gram (e.g., each tri-gram) of the input information. The input token-generating logic 302 can perform this operation using a lookup table, a trained neural network, etc. Each token that expresses linguistic information will be referred to as a linguistic token below.

An empty cell insert (ECI) logic 304 receives a set of input tokens from a preceding stage, which, in a first pass, corresponds to the input token-generating logic 302. It then adds placeholder cells between each pair of linguistic tokens, if not already provided in a previous iteration. It also adds a placeholder cell to the left of a first linguistic token in the set of input tokens (if not already provided) and adds a placeholder cell to the right of the last linguistic token in the set of input tokens (if not already provided). A placeholder cell is a particular type of token that does not designate any particular linguistic token and therefore may be considered "empty." It is a placeholder in the sense that it marks the place of a linguistic token that may be inserted in its place.

Token prediction and insertion (TPI) logic 306 receives a set of input tokens provided by the ECI logic 304. The set of input tokens in this case includes a set of linguistic tokens interspersed with placeholder cells in the manner described above. The TPI logic 306 performs analysis for each placeholder cell to predict the identity of the linguistic token that is the most appropriate candidate to replace the placeholder cell, given the neighboring linguistic tokens that are already included in the set of input expressions. The TPI logic 306 then replaces the placeholder cell with the linguistic token having the greatest likelihood, providing that this likelihood exceeds an environment-specific threshold value.

The TPI logic 306 can perform its prediction in any manner. In one implementation, the TPI logic 306 can perform its function using a statistical language model that determines a most likely linguistic token, given a set of preceding and/or following tokens. One such statistical model is a conditional random fields (CRF) model. Another is a hidden Markov model (HMM).

In another implementation, the TPI logic 306 can use any type of deep neural network (DNN) to perform this function, such as a convolutional neural network (CNN). A CNN can include one or more convolutional layers, one or more pooling layers, one or more fully-connected neural networks, etc., interspersed in any manner. A convolutional layer moves a window having a fixed character size across a set of tokens, to produce a set of window vectors. Each window vector includes a subset of tokens encompassed by the window at a particular position of the window. A pooling layer performs a down-sampling operation by condensing plural input vectors into a single output vector. A fully-connected neural network uses one or more layers of fully-connected neurons to map at least one input vector into at least one output vector. The CNN can include a classification component that operates on the output vector(s) provided by the fully-connected neural network. The classification component can be implemented as a softmax layer, a support vector machine model, etc.

Another DNN can perform prediction using an attention mechanism. An attention mechanism identifies the cross-relevance of tokens in a set of tokens. That is, when processing a particular token, the attention mechanism considers the relevance of each other token in the set of tokens to the particular token. Background information regarding the general topic of attention in neural networks can be found in Vaswani, et al., "Attention Is All You Need," arXiv:1706.03762v5 [cs.CL], Dec. 6, 2017, 15 pages.

The above examples are described herein by way of illustration not limitation; other implementations can use yet other mechanisms to perform a prediction function.

In one case, the TPI logic 306 performs the above-described analysis for each placeholder cell in the set of input tokens, to thereby replace as many placeholder cells with linguistic tokens as possible. After it is finished, the TPI logic 306 feeds an updated set of input tokens to the ECI logic 304. The ECI logic 304 then adds one or more new placeholder cells to the set of input tokens such that each pair of linguistic tokens continues to have a placeholder cell between the pair, and each initial linguistic token continues to have a placeholder cell to its left, and each terminal linguistic token continues to have a placeholder cell to its right. The TPI logic 306 then operates on this expanded set of input tokens. The machine-trained model 104 terminates this iterative series of operations when the TPI logic 306 concludes that it cannot predict a linguistic token to replace any placeholder cell with a prescribed degree of confidence, or the machine-trained model 104 reaches an environment-specific maximum number of iterations of the above-described process.

Upon reaching the above termination trigger, an output-generating logic 308 generates an NL expression and a semantic vector. More specifically, the output-generating logic 308 generates the NP expression by removing the placeholder cells from a set of output tokens provided by the last iteration of the TPI logic 306, to provide a final set of linguistic tokens. It then concatenates the remaining linguistic tokens. The output-generating logic 308 can map each linguistic token in this series of tokens to human-intelligible words using a lookup table or any other mapping mechanism.

The output-generating logic 308 generates the semantic vector by providing some type of transformation on the final set of linguistic tokens in the NL expression. For example, the output-generating logic 308 can generate the semantic vector by averaging the linguistic tokens in the series of linguistic tokens that make up the NL expression. Alternatively, the output-generating logic 308 can use any type of neural network to map the series of linguistic tokens into the semantic vector, e.g., using a linear transformation or one or more fully-connected layers that use any activation function.

In one case, the input information fed to the machine-trained model 104 includes one or more input keywords. Here, the output-generating logic 308 produces an NL expression that takes the form of at least one phrase that includes at least one of the input keyword(s) together with at least one added word that is not present in the input keyword(s). In another case, the input information includes an input phrase that already takes the form of an NL expression. Here, in some cases, the output-generating logic 308 generates a phrase that represents a modification of the input phrase.

In general, the output-generating logic 308 can be expected to produce an NL expression that is relatively unambiguous, even in those cases in which the input information that is fed to the machine-trained model 104 may lack clarity in one or more respects. This is because the machine-trained model 104 is trained based on a corpus of training examples that mostly include unambiguous NL expressions, which results in the production of a machine-trained model 104 that produces NL expressions of similar quality. In those cases in which the input information already includes an original phrase that is unambiguous, the machine-trained model 104 can be expected to produce a paraphrase of the original phrase, or, in some cases, an exact duplicate of the original phrase.

In one implementation, the TPI logic 306 includes the same set of machine-trained parameter values regardless of the stage in which it is invoked. In another implementation, the training system 106 produces a different set of machine-trained parameter values for each stage at which the TPI logic 306 is invoked. That is, the training system 106 can provide a first set of parameter values for application in a first iteration in which the TPI logic 306 is invoked. The training system 106 can provide a set second of machine-trained parameter values for application in a second iteration in which the TPI logic 306 is invoked, and so on. The first implementation (that uses the same set of parameter values for each iteration of the TPI logic 306) is more resource efficient and compact than the second implementation (that uses distinct sets of parameter values for different stages in which the TPI logic 306 is applied). But the second implementation can produce a better quality NL expression than the first implementation in some cases.

Further, in some implementations, the machine-trained model 104 does not place any constraints on the number of times that the ECI logic 304 and the TPI logic 306 can be invoked. In other implementations, the machine-trained model 104 sets a maximum number of times these two logic modules (304, 306) can be invoked.

In summary, the machine-trained model 104 operates by processing tokens in a plurality of stages, the plurality of stages including at least one cell-adding stage (provided by execution of the ECI logic 304) and at least one prediction stage (provided by execution of the TPI logic 306). Consider a particular cell-adding stage and a particular prediction that follows the particular cell-adding stage, these stages being representative of each cell-adding stage that is performed and each prediction stage that is performed. The particular cell-adding stage involves receiving a first set of input tokens provided by a stage that precedes the particular cell-adding stage, and adding at least one placeholder cell to the first set of input tokens. The particular prediction stage involves receiving a second set of input tokens provided by the particular cell-adding stage, and determining, for each particular placeholder cell in the second set of input tokens, whether a linguistic token is identified to replace the particular placeholder cell. In other words, the particular prediction stage involves determining, for each particular placeholder cell, whether there is a linguistic token that has a level of confidence that exceeds an environment-specific threshold value. If so, the particular prediction stage replaces the particular placeholder cell with the identified linguistic token. A final predicting stage is a stage in which no linguistic token is identified to replace any placeholder cell.

Figure 4:
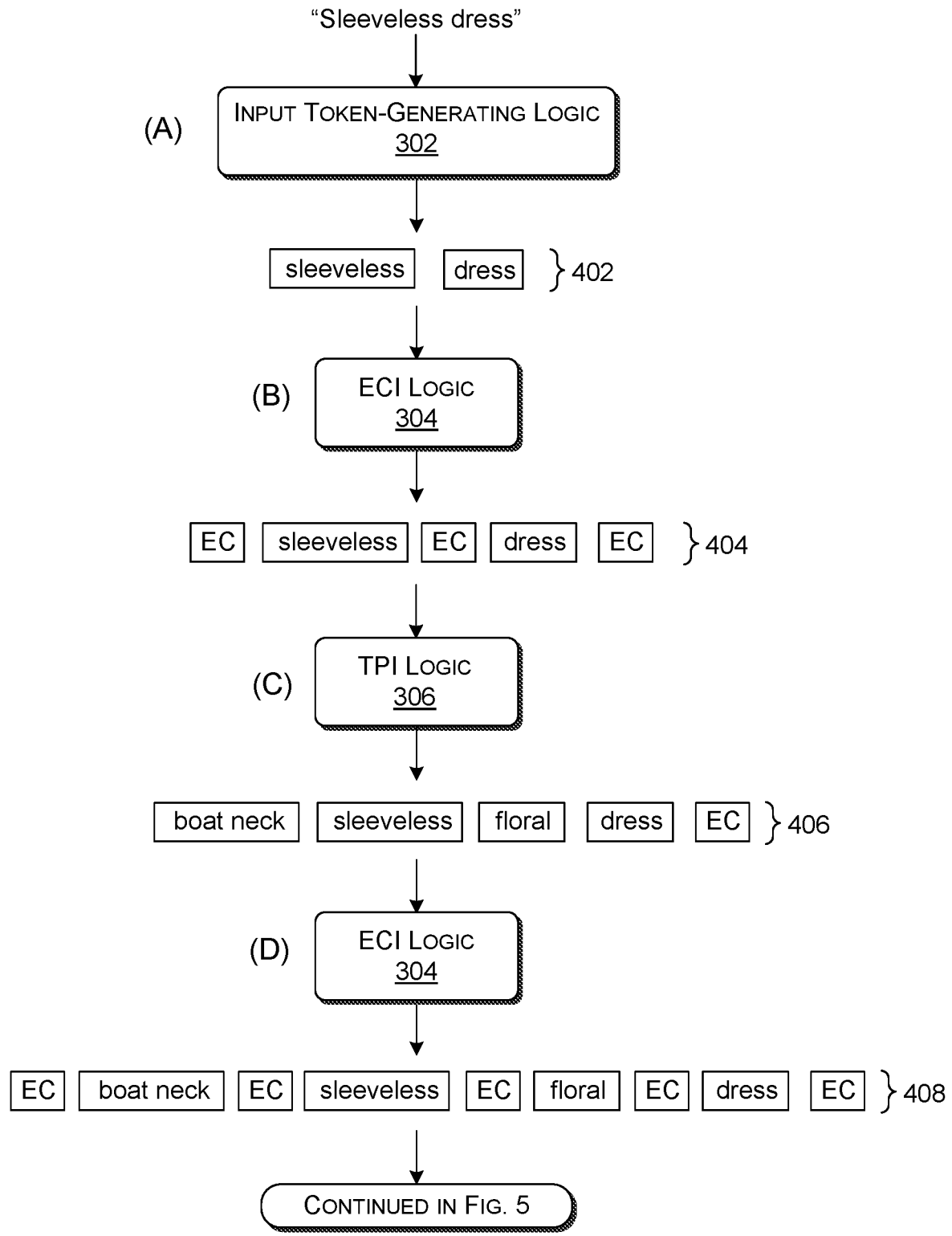
FIGS. 4 and 5 together show an example of the operation of the machine-trained model of FIG. 3.
Figure 5:
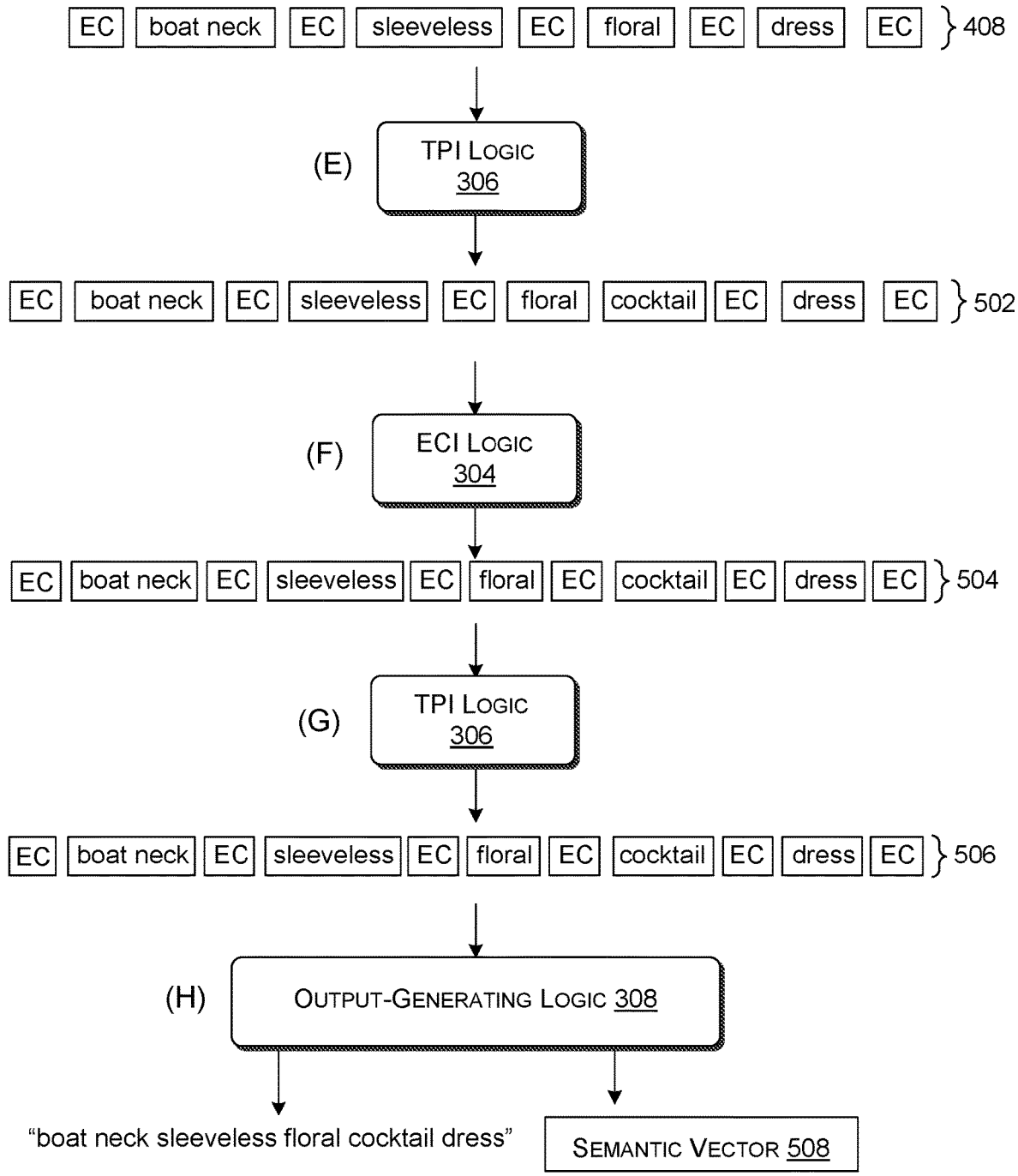

FIGS. 4 and 5 together show an example of the application of the machine-trained model 104 of FIG. 3. In stage (A), the input token-generating logic 302 receives input information that specifies the phrase "sleeveless dress." It converts each word to an input token, to overall provide a set of input tokens 402. In stage (B), the empty cell insertion (ECI) logic 304 inserts placeholder cells or empty cells ("ECs") between each pair of linguistic tokens, as well as to the left of the "sleeveless" token and the right of the "dress" token. More broadly stated, the ECI logic 304 adds at least one placeholder cell to a set of input tokens to produce a set of output tokens in which, for at least one particular linguistic token in the set of output tokens, the particular linguistic token is adjacent to at least one placeholder cell in the set of output tokens. In the context of stage (B), this produces a set of tokens 404. In stage (C), the token prediction and insertion (TPI) logic 306 predicts that the placeholder cell to the right of the "sleeveless" is most likely a linguistic token associated with the term "boat neck," and the placeholder cell between the "sleeveless" token and the "dress" token is most likely a linguistic token associated with the word "floral." The TPI logic 306 therefore replaces these placeholder cells with a "boat neck" token and a "floral" token, respectively. The TPI logic 306 determines that it cannot predict the word associated with the last-occurring placeholder cell (to the right of the "dress" token), and therefore leaves this placeholder intact. The output of this processing performed by the TPI logic 306 is a set of tokens 406.

The machine-trained model 104 repeats the above-described analysis performed by the ECI logic 304 and the TPI logic 306 one or more times until it determines that it can replace no placeholder cells with predicted linguistic tokens. That is, in stage (D), the ECI logic 304 inserts a placeholder cell to the right of the "boat neck" token, and a placeholder cell between the "sleeveless" token and the "floral" token. It also inserts a placeholder cell between the "floral" token and the "dress" token. This produces a set of tokens 408. In stage (E) of FIG. 5, the TPI logic 306 inserts a "cocktail" token after the "floral" token. This yields a set of updated tokens 502. In stage (F), the ECI logic 304 inserts a new placeholder cell between the "floral" token and the "cocktail" token, to produce a set of tokens 504. In stage (G), the TPI logic 306 determines that it cannot replace any placeholder cell with a predicted linguistic token, at which time the machine-trained model 104 concludes that it has now generated a final set of tokens 506.

In stage (H), the output-generating logic 308 generates an NL expression by removing the placeholder cells from the set of tokens 506. The output-generating logic 308 converts these linguistic tokens to corresponding words using a lookup table or a neural network, which yields the expression "boat neck sleeveless floral cocktail dress." The output-generating logic 308 also produces a semantic vector 508. As explained above, in one merely illustrative implementation, the output-generating logic 308 can perform this task by averaging the linguistic tokens associated with each of the linguistic tokens in the set of tokens 506.

The machine-trained model 104 can be modified in various ways. For instance, in another implementation, the TPI logic 306 can also predict whether any linguistic token should be replaced with one of its synonyms, or, more generally, a more appropriate linguistic token than the token in its present form. In addition, or alternatively, the TPI logic 306 can also predict whether the positions of any pair of neighboring linguistic tokens should be swapped. Still other variations are possible.

Note that the machine-trained model 104 produces the output information (the NL expression and the semantic vector 508) using a pipeline of stages. In each stage, the machine-trained model 104 fills in one or more part(s) of the final NL expression. The machine-trained model 104 differs from those language models that generate an expression by adding one token at a time by moving left to right, at each stage attempting to predict the next token given the preceding tokens processed so far.

Figure 6:
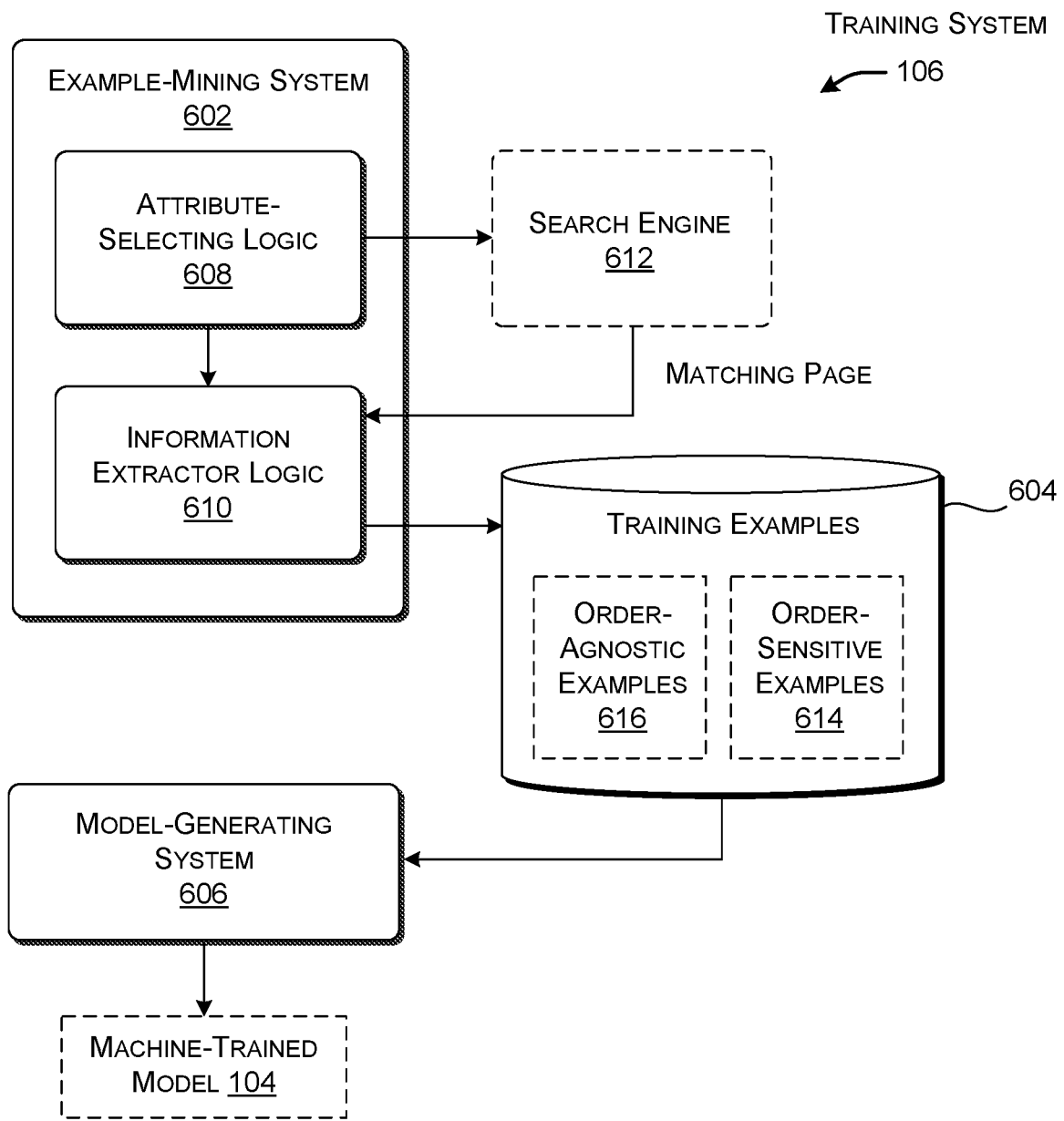
FIG. 6 shows one implementation of a training system used in the computing environment of FIG. 1.

FIG. 6 shows one implementation of the training system 106 introduced in FIG. 1. The training system 106 generates the machine-trained model 104 based on a set of training examples. By way of overview, an example-mining system 602 produces the training examples. A data store 604 stores the training examples. And a model-generating system 606 performs machine-training based on the training examples to produce the machine-trained model 104. As noted above, the machine-trained model 104 encompasses the logic shown in FIG. 3. In that context, the model-generating system 606 iteratively produces parameter values that govern the operation of at least the TPI logic 306 and, in some implementations, the output-generating logic 308.

One implementation of the example-mining system 602 includes attribute-selecting logic 608 and an information-extracting logic 610. The attribute-selecting logic 608 interacts with a search engine 612 to select a set of attribute values. For instance, attribute-selecting logic 608 can randomly select attribute values associated with a particular product. The search engine 612 finds at least one digital page that matches the selected set of attribute values. In one case, the search engine 612 may correspond to a general purpose search engine that is not affiliated with any provider of products. For instance, the general purpose search engine may correspond to the BING search engine provided by Microsoft Corporation of Redmond, Wash. In another case, the search engine 612 may correspond to a native search engine provided by a website hosted by a particular provider of products, such as a search engine provided by the website hosted by Amazon.com Inc. of Seattle, Wash. The information-extracting logic 610 then extracts one or more NL expressions from the digital page identified by the search engine 612. The example-mining system 602 produces at least one positive training example that includes the attribute values selected by the attribute-selecting 608 together with an NL expression extracted by the information-extracting logic 610.

Figure 7:
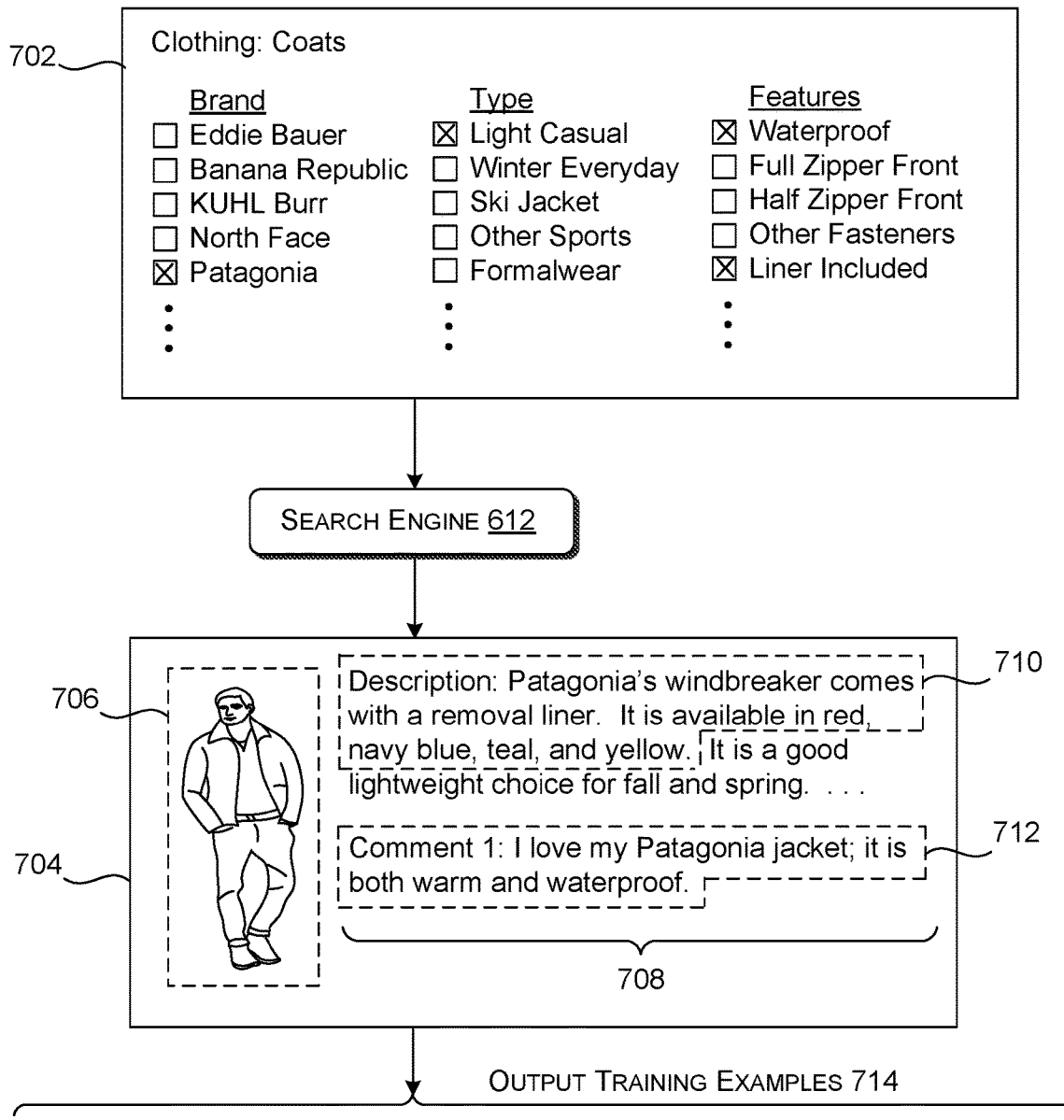
FIG. 7 shows an example of the operation of the training system of FIG. 6.

Advancing momentary to FIG. 7, this figure shown an example of the operation of the example-mining system 602. The attribute-selecting logic 608 begins by automatically accessing an interface page 702 hosted by a particular provider of products (such as Amazon.com Inc.). In this case, the attribute-selecting logic 608 specifically accesses an interface page 702 that allows a user to manually specify attribute values of a desired coat. The attribute-selecting logic 608 then automatically and randomly makes selections in the page 702. In one example, this yields the following attribute values: "Patagonia" for brand, "light casual" for type of the desired coat, and "waterproof" and "linear included" for features of the desired coat.

The search engine 612 of the provider identifies a product page 704 that matches the selected attribute values. The product page 704 optionally includes one or more images (such as image 706). The page 704 also includes text 708 within one or more page sections, such as a title section (not shown), a description section, a comment section, etc. The information-extracting logic 610 then identifies at one or more NL expression (if any) within the text 708 that satisfies a text extraction rule. In one implementation, for instance, the information-extracting logic 610 extracts any sentence that includes a predetermined number of attribute values selected in the interface page 702. Alternatively, or in addition, the information-extracting logic 610 can map the set of attribute values to a first vector in semantic space, map a candidate text snippet in the product page 704 to a second vector in semantic space, and then identify the candidate text snippet as a qualifying NL expression if the distance between the two vectors is below a prescribed threshold value. The information-extracting logic 610 can apply any other matching rules, drawing on any lexical features and/or semantic features to perform matching.

In the example of FIG. 7, the example-mining system 602 extracts at least two positive examples 714 based on two identified text snippets (710, 712). The first training example includes the selected set of attribute values together with the first text snippet 710. The second training example includes the selected set of attribute values together with the second text snippet 712. Although not shown, the example-mining system 602 can also extract negative mining examples by conjoining the set of attribute values with randomly-selected NL expressions, which, because they are randomly selected, are presumed to have no relation to the attribute values. This assumption can also be verified, e.g., by checking whether a natural language expression is related to a set of attribute values, and disqualifying this example as a valid negative example if the natural language expression is related to the set of attribute values.

The example-mining system 602 can perform a similar type of processing with respect to other sources of information. Each source of information provides instances of natural language text pertaining to respective items. Each instance of natural language text is further characterized by a set of attribute values, by which it can be located. For example, the example-mining system 602 can perform the same operations described above within the Wikipedia online encyclopedia, e.g., by selecting attribute values within a Wikipedia search interface, retrieving a Wikipedia page that matches the attribute values, and extracting NL expressions from the Wikipedia page that satisfy a prescribed extraction test.

In one implementation, each training example has a different level of potential usefulness depending on different factors, such as the source from which it is taken, the degree to which it matches the set of attribute values, etc. The model-generating system 606 can weight each training example in a manner that reflects its usefulness, that is, by assigning a larger weight value to a more valuable training example compared to a less valuable training example. The weight values will cause the training examples to exert varying degrees of influence in the training operation.

Returning to FIG. 6, the model-generating system 606 can use any training objective to train the machine-trained model 104. For example, the model-generating system 606 can iteratively increase the ability of the machine-trained model 104 to generate an NL expression that is identified as being correct, and iteratively decrease the probability that it will produce an NL expression that is identified as being incorrect. More specifically, the model-generating system 606 can perform this task by minimizing the distance between each model-generated semantic vector (which is based on a model-generated natural language expression) and a semantic vector produced for each training example's natural language expression. For example, consider a particular training example that includes a set of attribute values A and an illustrative natural language expression B that is pulled from a website in which it appears. The model-generated semantic vector for this training example is produced by operating on A, and is given by A'. The semantic vector for the site-obtained natural language expression is produced by directly operating on B, and is given by B'. The model-generating system 606 attempts to adjust its parameter values to reduce the distance between A' and B'. The model-generating system 606 can use stochastic gradient descent (SGD) to iteratively adjust the parameter values.

Further, in some implementations, the example-mining system 602 can optionally compile a first set 614 of training examples in which the order of words in the input information fed to the machine-trained model 104 has significance and should be preserved in any NL expression generated by the machine-trained model 104. The example-mining system 602 compiles a second set 616 of training examples in which the order of words in the input information is not significant and need not be preserved in any NL expression generated by the machine-trained model 104. The model-generating system 606 can optionally interweave training examples from these two sets (614, 616) in training the machine-trained model 104. When training based on a training example from the first set 614, the model-generating system 606 can apply weight values that act to penalize any NL expression that does not preserve the order of words specified in the corresponding input information. When training based on a training example from the second set 616, the model-generating system 606 applies weight values that do not act to penalize an NL expression based on whether or not it preserves the order of words in the input information.

In other implementations, the model-generating system 606 can apply the above two different training cases (and associated weighting values) to a single corpus of training examples, without first breaking the training examples into two classes as described above. That is, the model-generating system 606 can interweave training examples for which the preservation of words in the input information is considered important and training examples for which the preservation of words in the input information is not considered important, where the training examples are not grouped into different categories in advance. The training examples themselves will provide evidence as to when it is appropriate to preserve the order of words in the input information, and when the order of words does not matter.

In summary, the model-generating system 606 performs training that combines repeated application of a first training case and a second training case. The first training case is a case in which a prediction generated by the machine-trained model 104 is judged without respect to preservation of order of words in the input information that is fed to the machine-trained model 104. The second training case is a case in which a prediction generated by the machine-trained model 104 is not judged with respect to preservation of order of words in the input information that is fed to the machine-trained model 104. By virtue of this approach, the model-generating system 606 can produce a machine-trained model 104 that inherently recognizes when it is important to preserve the order of words, and when it need not preserve the order of words.

Finally, the training system 106 can generate a multilingual model by producing training examples expressed in multiple languages, and performing training on those multilingual training examples.

The technique described in this section has the advantage of allowing a user to more easily enter input information that expresses his or her intent, compared to the interfaces provided by other kinds of search engines. The technique achieves this result by allowing the user to enter textual information in any manner he or she chooses, including by specifying keywords, by specifying short descriptive phrases, by inputting complete sentences, etc. The technique further accommodates input information that suffers from various degrees of ambiguity. The technique is resilient to this kind of input because it is trained, based on a set of training examples, to convert the user's input information into an intelligible natural language expression.

The technique also converts the user's input information into a form that more faithfully represents the user's intent compared to some other search engines. The technique achieves this result, in part, by generating a semantic vector that is specifically predicated on a natural language expression. The technique, in turn, generates the natural language expression with the objective of unambiguously expressing the user's search objective in human-understandable terms. The technique does not translate the user's search objective into a computer interpretation that is specific to a particular implementation, and therefore does not suffer from the loss of information that may result from this translation.

The technique also provides a universal search interface by which users can explore data records originating from different providers. The technique also provides a way of conveniently adding and removing data records from a data store. For instance, the technique can add new conformant records to the data store 134 without adjusting its algorithms or modifying any existing data records in the data store 134. For instance, the technique can add new data records to the data store 134 without requiring retraining of the machine-trained model 104.

B. Illustrative Processes

Figure 8:
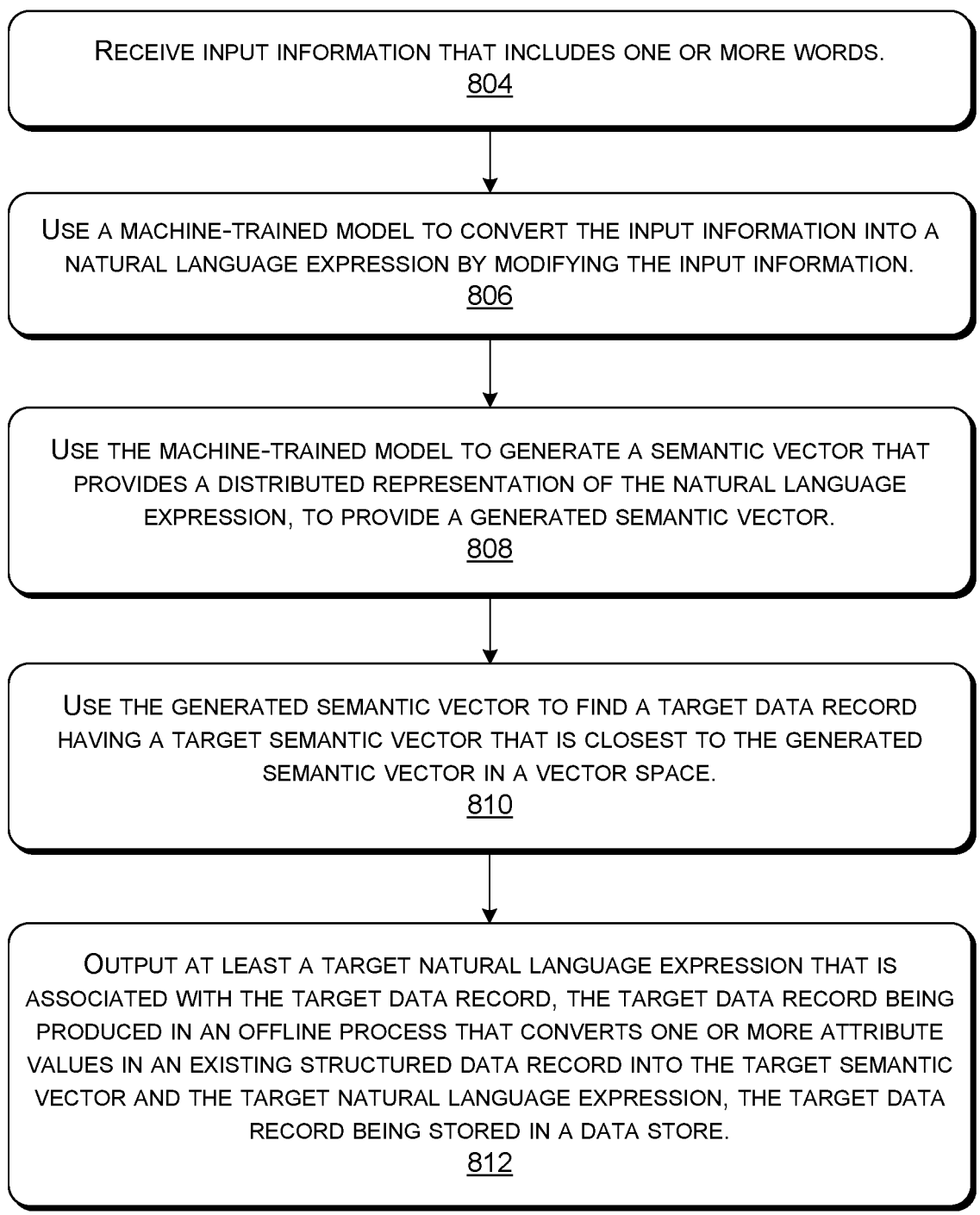
FIG. 8 shows a process that summarizes one manner in which an application (of FIG. 1) uses the machine-trained model of FIG. 3 to process the queries.
Figure 9:
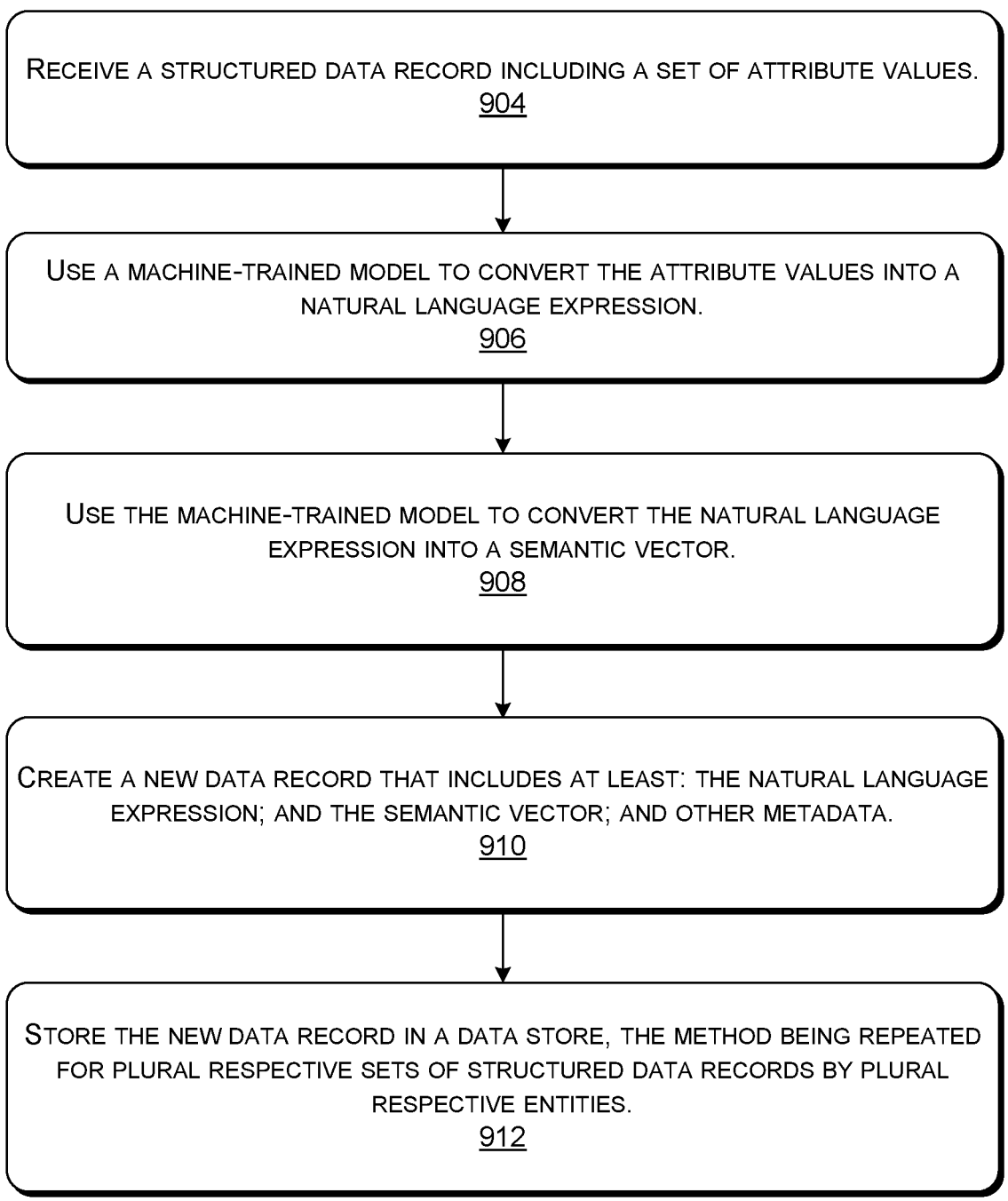
FIG. 9 shows a process that summarizes one manner in which a record transformation system (of FIG. 1) transforms an existing set of structured data records into updated data records using the machine-trained model of FIG. 3, in which each such updated data record includes a semantic vector and a natural language expression.

FIGS. 8-10 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 8 shows a process 802 that provides an overview of the operation of the application 110 shown in FIG. 1. In block 804, the application 110 receives input information that includes one or more words. In block 806, the application 110 uses the machine-trained model 104 to convert the input information into a natural language expression by modifying the input information. This operation, in turn, includes processing tokens in a plurality of stages. The plurality of stages include at least one cell-adding stage and at least one prediction stage. Consider a particular cell-adding stage and a particular prediction stage that follows the particular cell-adding stage, these stages being representative of each cell-adding stage that is performed and each prediction stage that is performed. The particular cell-adding stage involves receiving a first set of input tokens provided by a stage that precedes the particular cell-adding stage, and adding at least one placeholder cell to the first set of input tokens. The particular prediction stage involves receiving a second set of input tokens provided by the particular cell-adding stage, and determining, for each particular placeholder cell in the second set of input tokens, whether a linguistic token is identified to replace the particular placeholder cell. In block 808, the application 110 uses the machine-trained model 104 to generate a semantic vector that provides a distributed representation of the natural language expression, to provide a generated semantic vector. In block 810, the application 110 uses the generated semantic vector to find a target data record having a target semantic vector that is closest to the generated semantic vector in a vector space. In block 812, the application 110 outputs at least a target natural language expression that is associated with the target data record. The target data record is produced in an offline process that converts one or more attribute values in an existing structured data record into the target semantic vector and the target natural language expression. The target data record is stored in the data store 134.

FIG. 9 shows a process 902 that provides an overview of the operation of the record transformation system 108 of FIG. 1. In block 904, the record transformation system 108 receives a structured data record including a set of attribute values. In block 906, the record transformation system 108 uses the machine-trained model 104 to convert the attribute values into a natural language expression. In block 908, the record transformation system 108 uses the machine-trained model 104 to convert the natural language expression into a semantic vector. In block 910, the record transformation system 108 creates a new data record that includes at least: the natural language expression; and the semantic vector; and other metadata. In block 912, the record transformation system 108 stores the new data record in the data store 134. The process 902 may be repeated for plural respective sets of structured data records by plural respective entities.

Although not shown, the process 902 of FIG. 9 can include an operation of removing a particular structured data record in the data store 134 when a product corresponding to the particular structured data record is no longer provided by the entities. In other cases, the process 902 involves adding a new data record to the data store 134 when a new product not previously provided by the entities is offered; this operation involves performing steps in the process 902 with respect to a set of attribute values associated with the new product.

FIG. 10 shows a process 1002 that provides an overview of training the machine-trained model 104. In block 1004, the example-mining system 602 of FIG. 6 produces a plurality of training examples, each training example including a pair having a first member and a second member, the first member describing attribute values regarding a particular topic, and the second member identifying a linguistic expression that relates to the attribute values. In block 1006, the model-generating system 606 of FIG. 6 trains the machine-trained model 104 based on the training examples. The machine-trained model 104 is configured to convert input information into a natural language expression by modifying the input information in a plurality of stages in the manner described above for FIG. 8. The machine-trained model 104 is further configured to generate a semantic vector that provides a distributed representation of the natural language expression, to provide a generated semantic vector.

C. Representative Computing Functionality

Figure 11:
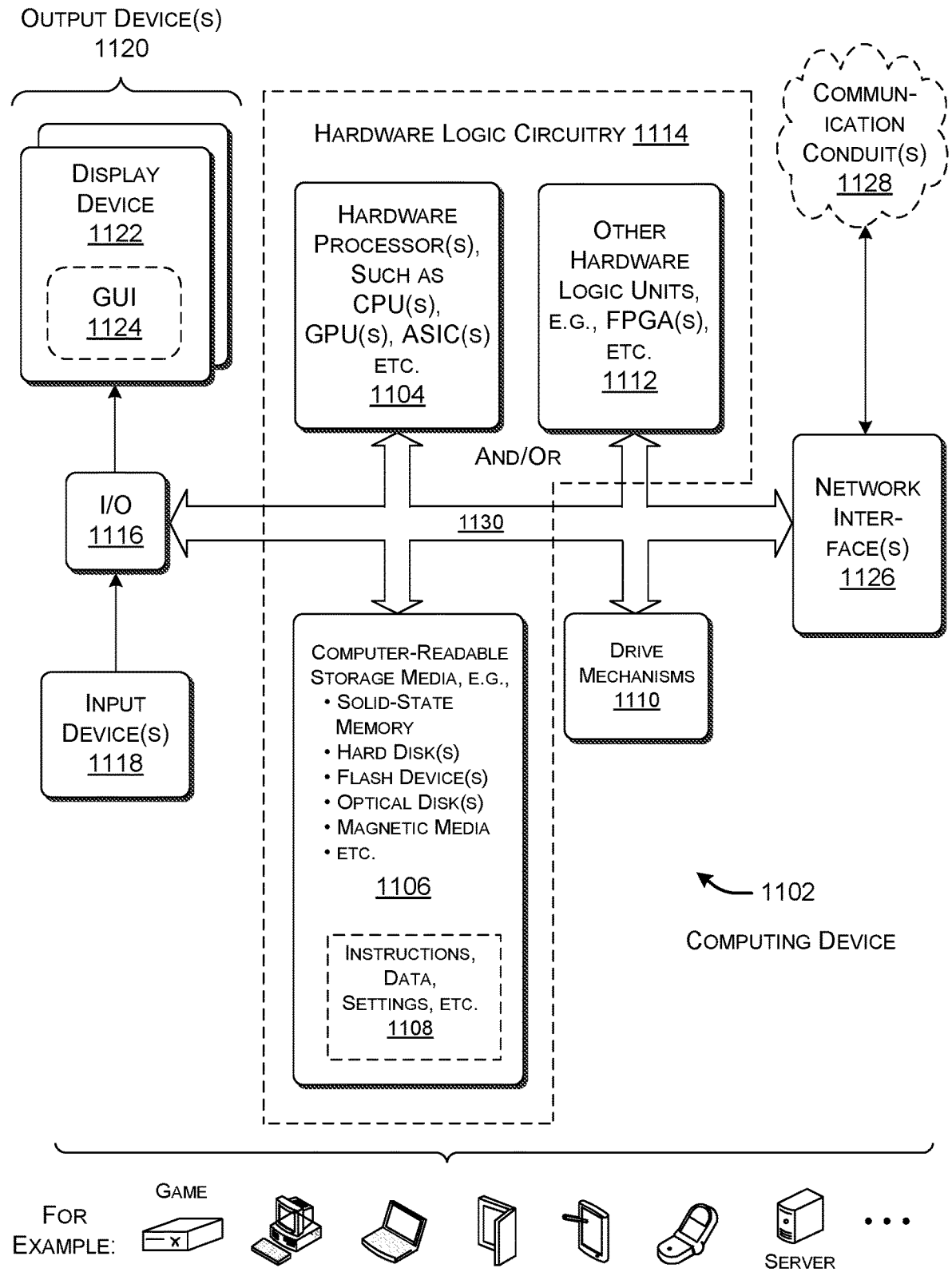
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, with reference to FIG. 1, the type of computing device 1102 shown in FIG. 11 can be used to implement any user computing device or any server. In all cases, the computing device 1102 represents a physical and tangible processing mechanism.

The computing device 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing device 1102. Further, any instance of the computer-readable storage media 1106 may provide volatile or non-volatile retention of information.

The computing device 1102 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing device 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s).

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units may correspond to discrete hardware units provided in a computing device chassis having any form factor. FIG. 11 shows illustrative form factors in its bottom portion. In other cases, the computing device 1102 can include a hardware logic unit that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative examples of the technology set forth herein.

According to a first example, a computer-implemented method is described for processing input information. The method incudes: receiving input information that includes one or more words and using a machine-trained model to convert the input information into a natural language expression by modifying the input information. The operation of using includes processing the input information in a plurality of stages, the plurality of stages including at least one cell-adding stage and at least one prediction stage. A particular cell-adding stage of the at least one cell-adding stage involves receiving a first set of input tokens provided by a stage that precedes the particular cell-adding stage, and adding at least one placeholder cell to the first set of input tokens. A particular prediction stage of the at least one prediction stage involves receiving a second set of input tokens provided by the particular cell-adding stage, and determining, for at least a particular placeholder cell in the second set of input tokens, whether a linguistic token is identified to replace the particular placeholder cell. The method further includes: using the machine-trained model to generate a semantic vector that provides a distributed representation of the natural language expression, to provide a generated semantic vector; using the generated semantic vector to find a target data record having a target semantic vector that is closest to the generated semantic vector in a vector space; and outputting at least a target natural language expression that is associated with the target data record. The target data record is produced in an offline process that converts one or more attribute values in an existing structured data record into the target semantic vector and the target natural language expression. The target data record is stored in a data store.

According to a second example, the input information includes one or more input keywords, and the natural language expression that is generated includes at least a phrase that includes the one or more input keywords together with at least one added word that is not present in the one or more input keywords.

According to a third example, the input information includes an input phrase, and the natural language expression that is generated includes a phrase that represents a modification of the input phrase.

According to a fourth example, the particular cell-adding stage involves adding the at least one placeholder cell to the first set of input tokens to produce a set of output tokens in which, for at least one particular linguistic token in the set of output tokens, the particular linguistic token is adjacent to at least one placeholder cell in the set of output tokens.

According to a fifth example, the operation of using a machine-trained model to convert the input information into a natural language expression involves executing plural cell-adding stages and plural prediction stages.

According to a sixth example, relating to the fifth example, a final prediction stage of the plural prediction stages is a stage in which no linguistic token is identified to replace any placeholder cell.

According to a seventh example, the operation of using the machine-trained model to generate a semantic vector includes: removing placeholder cells from a set of output tokens generated by a last-executed prediction stage, to provide a final set of linguistic tokens; and transforming the final set of linguistic tokens into the semantic vector.

According to an eighth example, relating to the seventh example, the operation of transforming includes averaging the final set of linguistic tokens.

According to a ninth example, a computer-implemented method is described for transforming a structured data record. The method includes: receiving a structured data record including a set of attribute values; using a machine-trained model to convert the attribute values into a natural language expression; using the machine-trained model to convert the natural language expression into a semantic vector; creating a new data record that includes at least the natural language expression and the semantic vector; and storing the new data record in a data store. The method is repeated for plural respective sets of structured data records provided by plural respective entities.

According to a tenth example, relating to the ninth example, the method further includes: removing a particular structured data record in the data store when a product corresponding to the particular structured data record is no longer provided by the entities; and adding a new data record to the data store when a new product not previously provided by the entities is offered, the adding involving performing the computer-implemented method with respect to a set of attribute values associated with the new product.

According to an eleventh example, relating to the ninth example, the operation of using the machine-trained model to convert the attribute values into a natural language expression operates in a plurality of stages including at least one cell-adding stage and at least one prediction stage. A particular cell-adding stage of the at least one cell-adding stage involves receiving a first set of input tokens provided by a stage that precedes the particular cell-adding stage, and adding at least one placeholder cell to the first set of input tokens. A particular prediction stage of the at least one prediction stage involves receiving a second set of input tokens provided by the particular cell-adding stage, and determining, for at least a particular placeholder cell in the second set of input tokens, whether a linguistic token is identified to replace the particular placeholder cell.

According to a twelfth example, relating to the eleventh example, the particular cell-adding stage involves adding the at least one placeholder cell to the first set of input tokens to produce a set of output tokens in which, for at least one particular linguistic token in the set of output tokens, the particular linguistic token is adjacent to at least one placeholder cell in the set of output tokens.

According to a thirteenth example, relating to the eleventh example, the operation of using the machine-trained model to convert the attribute values into a natural language expression executes plural cell-adding stages and plural prediction stages.

According to a fourteenth example, relating to the thirteenth example, a final prediction stage of the plural prediction stages is a stage in which no linguistic token is identified to replace any placeholder cell.

According to a fifteenth example, relating to the eleventh example, the operation of using the machine-trained model to convert the natural language expression into a semantic vector includes: removing placeholder cells from a set of output tokens generated by a last-executed prediction stage, to provide a final set of linguistic tokens; and transforming the final set of linguistic tokens into the semantic vector.

According to a sixteenth example, relating to the fifteenth example, the operation of transforming includes averaging the final set of linguistic tokens.

According to a seventeenth example, a computer-readable storage medium for storing computer-readable instructions is described. The computer-readable instructions, when executed by one or more hardware processors, perform a method that includes: producing a plurality of training examples, each training example including a pair having a first member and a second member, the first member describing attribute values regarding a particular topic, and the second member identifying a linguistic expression that relates to the attribute values; and training a machine-trained model based on the training examples, the machine-trained model being configured to convert input information into a natural language expression by modifying the input information in a plurality of stages, the plurality of stages including at least one cell-adding stage and at least one prediction stage. A particular cell-adding stage of the at least one cell-adding stage involves receiving a first set of input tokens provided by a stage that precedes the particular cell-adding stage, and adding at least one placeholder cell to the first set of input tokens. A particular prediction stage of the at least one prediction stage involves receiving a second set of input tokens provided by the particular cell-adding stage, and determining, for at least a particular placeholder cell in the second set of input tokens, whether a linguistic token is identified to replace the particular placeholder cell. The machine-trained model is further configured to generate a semantic vector that provides a distributed representation of the natural language expression, to provide a generated semantic vector.

According to an eighteenth example, relating to the sixteenth example, the operation of producing produces a training example by: automatically selecting a set of attribute values; receiving a digital page that matches the set of attribute values that have been selected; and extracting at least one natural language expression from the digital page that satisfies a prescribed extraction test.

According to a nineteenth example, relating to the seventeenth example, the training combines repeated application of a first training case and a second training case. The first training case is a case in which a prediction generated by the machine-trained model is judged without respect to preservation of order of words in the input information that is fed to the machine-trained model. The second training case is a case in which a prediction generated by the machine-trained model is not judged with respect to preservation of order of words in the input information that is fed to the machine-trained model.

According to a twentieth example, relating to the seventeenth example, the operation of using the machine-trained model to convert the natural language expression into a semantic vector includes: removing placeholder cells from a set of output tokens generated by a last-executed prediction stage, to provide a final set of linguistic tokens; and transforming the final set of linguistic tokens into the semantic vector.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing input information, comprising:
   receiving the input information, the input information including one or more words;
   using a machine-trained model to convert the input information into a natural language expression by modifying the input information,
      said using including processing the input information in a plurality of stages, the plurality of stages including at least one cell-adding stage and at least one prediction stage,
      a particular cell-adding stage of said at least one cell-adding stage involving receiving a first set of input tokens provided by a stage that precedes the particular cell-adding stage, and adding at least one placeholder cell to the first set of input tokens, and
      a particular prediction stage of said at least one prediction stage involving receiving a second set of input tokens provided by the particular cell-adding stage, and determining, for at least a particular placeholder cell in the second set of input tokens, whether a linguistic token is identified to replace the particular placeholder cell;
   using the machine-trained model to generate a semantic vector that provides a distributed representation of the natural language expression, to provide a generated semantic vector;
   using the generated semantic vector to find a target data record having a target semantic vector that is closest to the generated semantic vector in a vector space; and
   outputting at least a target natural language expression that is associated with the target data record,
   the target data record being produced in an offline process that converts one or more attribute values in an existing structured data record into the target semantic vector and the target natural language expression,
   the target data record being stored in a data store.

2. The computer-implemented method of claim 1, wherein the input information includes one or more input keywords, and the natural language expression that is generated includes at least a phrase that includes said one or more input keywords together with at least one added word that is not present in said one or more input keywords.

3. The computer-implemented method of claim 1, wherein the input information includes an input phrase, and the natural language expression that is generated includes a phrase that represents a modification of the input phrase.

4. The computer-implemented method of claim 1, wherein the particular cell-adding stage involves adding said at least one placeholder cell to the first set of input tokens to produce a set of output tokens in which, for at least one particular linguistic token in the set of output tokens, the particular linguistic token is adjacent to at least one placeholder cell in the set of output tokens, the set of output tokens corresponding to the second set of input tokens provided to the particular prediction stage.

5. The computer-implemented method of claim 1, wherein said using a machine-trained model to convert the input information into a natural language expression involves executing plural cell-adding stages and plural prediction stages.

6. The computer-implemented method of claim 5, wherein a final prediction stage of the plural prediction stages is a stage in which no linguistic token is identified to replace any placeholder cell.

7. The computer-implemented method of claim 1, wherein said using the machine-trained model to generate a semantic vector further comprises:
removing placeholder cells from a set of output tokens generated by a last-executed prediction stage, to provide a final set of linguistic tokens; and
transforming the final set of linguistic tokens into the generated semantic vector.

8. The computer-implemented method of claim 7, wherein said transforming comprises averaging the final set of linguistic tokens.

9. A computer-implemented method of transforming a structured data record, comprising:
receiving the structured data record, the structured data record including a set of attribute values;
using a machine-trained model to convert the attribute values into a natural language expression;
using the machine-trained model to convert the natural language expression into a semantic vector;
creating a new data record that includes at least the natural language expression and the semantic vector; and
storing the new data record in a data store,
the computer-implemented method being repeated for plural respective sets of structured data records provided by plural respective entities,
wherein said using the machine-trained model to convert the attribute values into a natural language expression operates in a plurality of stages including at least one cell-adding stage and at least one prediction stage,
a particular cell-adding stage of said at least one cell-adding stage involving receiving a first set of input tokens provided by a stage that precedes the particular cell-adding stage, and adding at least one placeholder cell to the first set of input tokens, and
a particular prediction stage of said at least one prediction stage involving receiving a second set of input tokens provided by the particular cell-adding stage, and determining, for at least a particular placeholder cell in the second set of input tokens, whether a linguistic token is identified to replace the particular placeholder cell.

10. The computer-implemented method of claim 9, further comprising:
removing a particular structured data record in the data store when a product corresponding to the particular structured data record is no longer provided by the entities; and
adding a new data record to the data store when a new product not previously provided by the entities is offered, said adding involving performing the computer-implemented method with respect to a set of attribute values associated with the new product.

11. The computer-implemented method of claim 9, wherein the particular cell-adding stage involves adding said at least one placeholder cell to the first set of input tokens to produce a set of output tokens in which, for at least one particular linguistic token in the set of output tokens, the particular linguistic token is adjacent to at least one placeholder cell in the set of output tokens, the set of output tokens corresponding to the second set of input tokens provided to the particular prediction stage.

12. The computer-implemented method of claim 9, wherein said using the machine-trained model to convert the attribute values into a natural language expression executes plural cell-adding stages and plural prediction stages.

13. The computer-implemented method of claim 12, wherein a final prediction stage of the plural prediction stages is a stage in which no linguistic token is identified to replace any placeholder cell.

14. The computer-implemented method of claim 9, wherein said using the machine-trained model to convert the natural language expression into a semantic vector further comprises:
removing placeholder cells from a set of output tokens generated by a last-executed prediction stage, to provide a final set of linguistic tokens; and
transforming the final set of linguistic tokens into the semantic vector.

15. The computer-implemented method of claim 14, wherein said transforming comprises averaging the final set of linguistic tokens.

16. A computer-readable storage medium for storing computer-readable instructions, the computer-readable instructions, when executed by one or more hardware processors, performing a method that comprises:
producing a plurality of training examples, each training example including a pair having a first member and a second member, the first member describing attribute values regarding a particular topic, and the second member identifying a linguistic expression that relates to the attribute values; and
training a machine-trained model based on the training examples, the machine-trained model being configured to convert input information into a natural language expression by modifying the input information in a plurality of stages, the plurality of stages including at least one cell-adding stage and at least one prediction stage,
a particular cell-adding stage of said at least one cell-adding stage involving receiving a first set of input tokens provided by a stage that precedes the particular cell-adding stage, and adding at least one placeholder cell to the first set of input tokens,
a particular prediction stage of said at least one prediction stage involving receiving a second set of input tokens provided by the particular cell-adding stage, and determining, for at least a particular placeholder cell in the second set of input tokens, whether a linguistic token is identified to replace the particular placeholder cell, and
the machine-trained model further being configured to generate a semantic vector that provides a distributed representation of the natural language expression, to provide a generated semantic vector.

17. The computer-readable storage medium of claim 16, wherein said producing produces a training example by:
automatically selecting a set of attribute values;
receiving a digital page that matches the set of attribute values that have been selected; and
extracting at least one natural language expression from the digital page that satisfies a prescribed extraction test.

18. The computer-readable storage medium of claim 16, wherein said training combines repeated application of a first training case and a second training case, the first training case being a case in which a prediction generated by the machine-trained model is judged without respect to preservation of order of words in the input information that is fed to the machine-trained model, and the second training case being a case in which a prediction generated by the machine-trained model is not judged with respect to preservation of order of words in the input information that is fed to the machine-trained model.

19. The computer-readable storage medium of claim 16, wherein said using the machine-trained model to convert the natural language expression into a semantic vector comprises:

removing placeholder cells from a set of output tokens generated by a last-executed prediction stage, to provide a final set of linguistic tokens; and transforming the final set of linguistic tokens into the semantic vector.

\* \* \* \* \*